United States Patent [19]

Lin

[11] Patent Number: 4,970,723

[45] Date of Patent: Nov. 13, 1990

[54] ISDN, BASIC RATE INTERFACE ARRANGED FOR QUAD VOICE

[75] Inventor: T. P. Lin, Piscataway, N.J.

[73] Assignee: AT&T Bell Laboratories, Murray Hill, N.J.

[21] Appl. No.: 251,483

[22] Filed: Sep. 30, 1988

[51] Int. Cl.$^5$ .............................................. H04J 3/12
[52] U.S. Cl. ................................. 370/110.1; 370/85.9
[58] Field of Search ...................... 370/118, 110.1, 58, 370/60, 85.9, 85.11

[56] References Cited

U.S. PATENT DOCUMENTS

| | | | |
|---|---|---|---|
| 4,553,235 | 11/1985 | Svensson | 370/85.9 |
| 4,581,737 | 4/1986 | Sparrell | 370/118 |
| 4,740,955 | 4/1988 | Litterer et al. | 370/85.11 |
| 4,782,485 | 11/1988 | Gollub | 370/118 |

FOREIGN PATENT DOCUMENTS 2616617  10/1976  Fed. Rep. of Germany ...... 370/118

OTHER PUBLICATIONS

J. P. Delatore et al., "Implementation of ISDN on the 5 ESS Switch," *IEEE Jl. on Sel. Areas in Comm.*, vol. SAC-4, No. 8, Nov. (1986), pp. 1262-1267.
D. L. Carney et al., "ISDN in the 5 ESS Switch," *Telephony*, Dec. 8, 1986, pp. 98-108.
R. A. Fishel, "ISDN Implementation in the 5 ESS TM Switch," *Globecom* 86, vol. pp. 349-354.
C. L. Wong et al., "DMS-100 Evolution—An ISDN Perspective", *GLOBECOM* 86, vol. 1, pp. 355-363.
H. Beckh, "Call Processing EWSD Subscriber Service Features," *Telecom Report* 10, No. 3, 1987, pp. 126-129.
B. Newman, "An ISDN Data and Voice Terminal Based on a Personal Computer," *GLOBECOM* 85, vol. 3, pp. 1048-1052.
T. O'Toole, "ISDN Terminals Simplify Data Transmissions," *EDN*, Jan. 22, 1987, pp. 167-174.
R. A. Windhausen et al., "Basic Access Network Termination Chip for ISDN 4-Wire Loops," *AT&T Tech. Jl.*, Nov./Dec. 1987, pp. 35-50.

Primary Examiner—Douglas W. Olms
Assistant Examiner—Christopher O. Edwards
Attorney, Agent, or Firm—Richard B. Havill; Thomas Stafford

[57] ABSTRACT

A single international standard integrated services digital network (ISDN), basic rate interface (BRI) is arranged so that either a data terminal and two voice terminals, three voice terminals, or four voice terminals can be operated simultaneously through the interface. Code converters, associated with the voice terminals and with a central office switch, convert eight-bit voice sample code from either the voice terminals or the central office switch to four-bit voice sample code in the interface to enable the bit streams of two voice terminals to be merged for transmission through a single B-channel at the interface. When two voice terminals are operated simultaneously through one B-channel, each of those terminals positions four-bit coded voice samples in a different sub B-channel of the B-channel and stuffs four bits in the other sub B-channel. Four-bit coded voice samples from the sub B-channels are converted to voice samples in the voice terminals and to eight-bit codes voice samples in the central office switch.

17 Claims, 7 Drawing Sheets

ORIGINATING TERMINAL | CENTRAL OFFICE SWITCH

OFF HOOK

→ SETUP
(BEARER CAPABILITY, CALL REFERENCE VALUE)

← SETUP ACKNOWLEDGE
(CHANNEL IDENTIFICATION)

→ INFORMATION
(DIGIT)

⋮

→ INFORMATION
(DIGIT)

← CALL PROCEEDING

FIG. 3

INFORMATION ELEMENT

| OCTET | BIT | | | | | | | |
|---|---|---|---|---|---|---|---|---|
| | 8 | 7 | 6 | 5 | 4 | 3 | 2 | 1 |
| 1 | CHANNEL ID INFORMATION ELEMENT ID | | | | | | | |
| 2 | LENGTH OF CHANNEL ID INFORMATION | | | | | | | |
| 3 | EXT | INT ID | INT TYPE | CHAN ASGN | PREF EXCL | D-CH IND | CHAN ASGN | CHAN ASGN |

FIG. 4

| CHANNEL ASSIGNMENT | BIT | | |
|---|---|---|---|
| | 5 | 2 | 1 |
| NO CHANNEL | 0 | 0 | 0 |
| B1 | 0 | 0 | 1 |
| B2 | 0 | 1 | 0 |
| ANY CHANNEL | 0 | 1 | 1 |
| B11 | 1 | 0 | 0 |
| B12 | 1 | 0 | 1 |
| B21 | 1 | 1 | 0 |
| B22 | 1 | 1 | 1 |

FIG. 5 NETWORK TERMINATION 33 TO A TERMINAL

FIG. 6 TERMINAL TO NETWORK TERMINATION 33

| SEQUENTIAL TERMINAL OPERATION | CHANNEL/SUBCHANNEL ASSIGNMENTS |
|---|---|
| T22 | B1 |
| T22,T24 | B1,B2 |
| T22,T24,T23 | B1,B2,REJECT/BUSY |
| T22,T24,T28 | B1,B2,REJECT/BUSY |
| T22,T24,T25 | B1,B21,B22 |
| T22,T24,T25,T29 | B1,B21,B22,REJECT/BUSY |

FIG. 12

| SEQUENTIAL TERMINAL OPERATION | CHANNEL/SUBCHANNEL ASSIGNMENTS |
|---|---|
| T24,T25 | B1,B2 |
| T24,T25,T22 | B11,B12,B2 |
| T24,T25,T28 | B1,B22,B21 |
| T24,T25,T28,T26 | B1,B22,B21,REJECT/BUSY |
| T24,T25,T28,T27 | B11,B22,B21,B12 |
| T24,T25,T28,T27,T22 | B11,B22,B21,B12,REJECT |
| T24,T25,T28,T27,T26 | B11,B22,B21,B12,REJECT |

FIG. 13

| SEQUENTIAL TERMINAL OPERATION | CHANNEL/SUBCHANNEL ASSIGNMENTS |
|---|---|
| T24,T26 | B1,B2 |
| T24,T26,T22 | B1,B2,REJECT/BUSY |
| T24,T25,T23 | B11,B12,B2 |
| T24,T25,T27,T22 | B11,B2,B12,REJECT/BUSY |

ISDN, BASIC RATE INTERFACE ARRANGED FOR QUAD VOICE

This invention relates to an international standard integrated services digital network (ISDN), basic rate interface (BRI) arrangement.

BACKGROUND OF THE INVENTION

Integrated services digital network is defined by internationally accepted standard digital network user interfaces. The resulting network of access lines and switches is a general purpose digital network capable of supporting access from terminals to a wide range of interconnected services, such as, voice, data, facsimile, and video, by using the standard digital network-user interfaces, i.e., the interfaces between the network and the users. Currently there are two CCITT recommended standard integrated services digital network interfaces for user access. They include the basic rate interface (BRI) and a primary rate interface (PRI).

A variety of voice and data services are available through the integrated services digital network, basic rate interface. Known technology allows the loop plant to transport voice, data, and out-of-band signaling through a four-wire bus, a network termination, and a two-wire loop to a central office. Packet switching in the network provides economical data switching by freeing common resources, during nonactive periods in one call, for use by another call. The International Telegraph and Telephone Consultative Committee (CCITT) defined a Q.931 out-of-band signaling protocol for call control from and to end terminals in an integrated services digital network.

The central office switch provides an integrated services digital network, basic rate interface including two sixty-four kbps B-channels B-1 and B-2 used by voice and/or data calls and one D-channel used for signaling and/or low speed data. A B-channel is a bearer channel. A D-channel is a demand channel. With the integrated services digital network, basic rate interface, the switch supports both the CCITT standard four-wire, T digital subscriber loop interface and the American National Standard Institute (ANSI) standard two-wire U interface. The basic rate interface is arranged to provide simultaneous voice and data services in several ways giving users flexibility in configuring their services. The users use either B-channel for voice service, for circuit switched data transport, or for packet switched data services. The D-channel can carry packet switched data which interleaves data packets with signaling packets. The Q.931 out-of-band signaling protocol is carried out through the D-channel on a time shared basis. Standard NT1 and NT2 network terminations are interposed between the central office and the terminal equipment.

Sixty-four kbps pulse code modulation (PCM) technology presently is used for converting analog voice signals to digitized voice signals which are transmitted through one of the B-channels. In that technology, analog voice signals are sampled at regular intervals. Those samples are quantized into discrete values. The discrete values of the samples are encoded into eight-bit binary code words, and those code words are converted into a sixty-four kbps pulse code modulation bit stream for transmission through a B-channel. The aforementioned prior art sixty-four kbps pulse code modulation bit stream requires an entire sixty-four kbps B-channel for transmission in the known integrated services digital network, basic rate interface. A data B-channel also uses an entire sixty-four kbps B-channel for transmission in the known integrated services digital network, basic rate interface.

As a result of the required channel capacities in the prior art, the basic rate interface has been limited to providing a maximum of either two data B-channels or one voice B-channel and another voice or data B-channel. The prior art limit of one voice and one data channel or the other prior art limit of two voice channels per basic rate interface is insufficient voice channel capacity for providing adequate voice service for some large families or high-income families and for some cottage industries and other small businesses.

A problem arises in a single basic rate interface when two voice terminals or a data terminal and a voice terminal are active simultaneously and a third voice terminal desires to commence operation at once or is being called. With the present arrangement, no B-channel is available for commencing immediate operation by or to the third voice channel.

SUMMARY OF THE INVENTION

The aforementioned problem is solved by a communication system including a switch for interconnecting a plurality of voice or data terminals. A single international standard integrated services digital network (ISDN), basic rate interface (BRI) interposed between the switch and the plurality of voice or data terminals enables at least three voice terminals or a data terminal and two voice terminals to operate simultaneously through the B-channels of the basic rate interface to the switch.

Apparatus for accomplishing these features provides the functions of a single international standard integrated services digital network, basic rate interface pair of four-wire busses having two B-channel bit streams under control of a D-channel bit stream. In addition the apparatus includes at least three voice terminals, which are coupled to the pair of four-wire busses and are operated simultaneously through the single basic rate interface.

Service for three or more voice terminals through one international standard integrated services digital network, basic rate interface, is provided by: (1) converting a first voice sample from a first customer voice terminal into four bits of digitized voice data and positioning those bits into a first nibble of an octet in a B-channel, and (2) converting a second voice sample from a second customer voice terminal into four bits of digitized voice data and positioning those bits into a second nibble of the same octet in the B-channel.

Other apparatus for accomplishing the aforementioned features provides the functions of a single international standard integrated services digital network, basic rate interface two-wire loop having two B-channel bit streams under control of a D-channel bit stream. In this other apparatus, the two-wire loop is connected with a switch and an arrangement for coupling simultaneously into the two B-channel bit streams at least three integrated services digital network voice terminal bit streams.

Service for three or more voice terminal bit streams through one international standard integrated services digital network, basic rate interface two-wire loop is provided by: (1) converting a first voice sample to be transmitted to a first customer voice terminal into four bits of digitized voice data and positioning those bits into a first nibble of an octet in a B-channel, and (2) converting a second voice sample to be transmitted to a second customer voice terminal into four bits of digitized voice data and positioning those bits into a second nibble of the same octet in the B-channel.

In another advantageous arrangement, a single international standard basic rate interface pair of four-wire busses has two B-channel bit streams under control of a D-channel bit stream. A sixty-four kbps data channel and two integrated services digital network voice terminals are connected to the pair of four-wire busses and are operated simultaneously.

In the various arrangements a PCM/ADPCM converter circuit converts eight-bit code words into four-bit code words for representing voice samples in a nibble of a B-channel. Four bits of neutral line signal are stuffed into the other nibble of the B-channel by the PCM/ADPCM converter circuit.

BRIEF DESCRIPTION OF THE DRAWING

These and other features of an illustrative embodiment of the invention may be best understood by reading the subsequent detailed description with reference to the attached drawing wherein.

DETAILED DESCRIPTION

Figure 1:
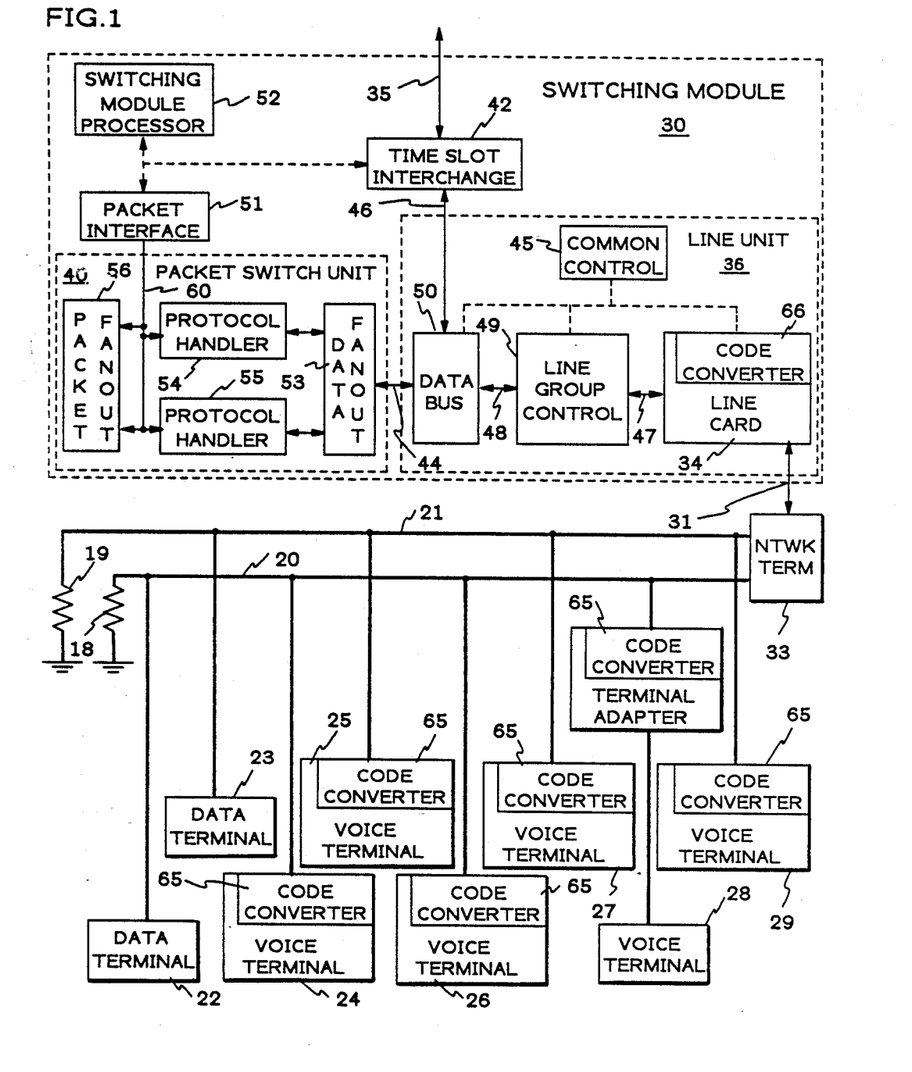
FIG. 1 represents an integrated services digital network (ISDN), basic rate interface (BRI) that is located between a central office switch and a group of terminals.

Referring now to FIG. 1, there is shown a standard international integrated services digital network (ISDN), basic rate interface (BRI) pair of four-wire busses 20, 21 connecting a group of terminal equipments 22, 23, 24, 25, 26, 27, 28, and 29 through a network termination 33 and a two-wire loop 31 to a central office switching module 30. Bus terminations 18 and 19 terminate the busses 20 and 21. The basic rate interface provides two sixty-four kbps B-channels B1, B2 and one sixteen kbps D-channel. Terminal equipments include both data terminals 22, 23 and voice terminals 24, 25, 26, 27, 28 and 29.

Advantageously, the B-channels are arranged at both the terminal ends and at the central office switching module 30 so that the sixty-four kbps B-channel B1 selectively is divided into and used as two thirty-two kbps sub B-channel voice channels B11 and B12. Similarly the sixty-four kbps B-channel B2 also is selectively divided into two thirty-two kbps sub B-channel voice channels B21 and B22. The B-channels B1 and B2 also selectively are used for sixty-four kbps voice or data transmission.

The basic rate interface is implemented in the central office switch using a digital subscriber line card 34 in the integrated services line unit 36, which terminates a digital subscriber loop in the switching module 30. Other digital subscriber loops (not shown) also are terminated at other integrated services line units (not shown) in the switching module 30. Additional switching modules (not shown) that interconnect with a bus 35 also are a part of the central office switch.

In FIG. 1, the central office switching module 30 provides a two-wire loop interface to the loop 31 and contains all of the software needed for supporting customer terminal features through the four-wire busses 20 and 21. The switching module 30 is equipped with a packet switch unit 40 to provide a centralized, high-bandwidth interface to support signaling messages and packet switching of X.25 data.

The integrated services line unit 36 interconnects to the packet switch unit 40 and a time slot interchanger 42 of the switch module 30 through peripheral interface data busses 44 and 46 each of which is arranged as a bus with thirty-two time slots. Each time slot supports a sixty-four kbps transmission rate. The internal network of the integrated services line unit 36 includes a common control circuit 45, group interface data bus 47 and line interface data bus 48. The common control circuit 45 coordinates the functions of the integrated services line unit 36. Group interface data bus 47 connects the line card 34 with a line group controller 49. Line interface data bus 48 connects the line group controller 49 to a common data bus 50. Group interface data bus 47 and line interface data bus 48 both provide several time slots for B-channel and D-channel transmissions. The time slot paths of the internal network can be used by either circuit switched or packet switched calls. Circuit switched time slot paths are hunted at the initiation of a call. Packet switched paths are established whenever a digital subscriber loop card is put in service. Thus there are duplicate connections which may be established from each digital subscriber loop to the packet switching network. The interface between peripheral interface data busses 44, 46 and the internal integrated services line unit 36 is the common data bus 50.

The packet switching unit 40 has two communication interfaces. Customer communication to and from the integrated services line unit 36 occurs through the peripheral interface data bus 44 between the common data bus 50 and packet switching unit 40. Customer information terminates at protocol handlers 54, 55. Communication to and from a packet interface 51 and the switching module processor 52 occurs through a packet bus 60. The packet bus 60, a packet fanout circuit 56, and the packet interface 51 provide a high-level control and signaling interface between the packet switching unit 40 and the switching module processor 52. The packet bus 60 is a high-speed communication path which provides efficient transfer of bursts within the packet switching unit 40 and between the packet switching unit 40 and the switching module processor 52. Each protocol handler 54, 55 has an interface to the packet bus 60. The packet bus 60 logically interconnects all protocol handlers of the packet switching unit 40. Only two of the protocol handlers are shown in FIG. 1. Time slot interchanger 42, packet interface 51, and switching module processor 52 provide the main control for the switching module 30. They interchange time slots between peripheral units of the switching module 30 and the network (not shown), and provide interfaces to a communication module (not shown) and peripheral units (not shown). Time slot interchanger 42 performs time division switching functions. Switching module processor 52 provides stored program control including call processing functions.

Data terminals 22 and 23 are digital terminals which support the standard integrated services digital network interface.

Voice terminals 24, 25, 26, 27 and 29 are integrated services digital network terminal equipments. Each is arranged to convert a user's analog voice signals into sixty-four kbps pulse code modulation signals for the four-wire busses 20 and 21 and to convert sixty-four kbps pulse code modulation signals from the four-wire busses 20 and 21 to analog voice signals for the user.

Voice terminal 28 is a non-integrated services digital network terminal equipment. Thus voice terminal 28 is connected through a terminal adapter 32 to the four-wire bus 20. One function of the terminal adapter 32 is to convert analog voice signals from the voice terminal 28 into sixty-four kbps pulse code modulation signals to be applied onto the four-wire bus 20. Another function is the conversion of sixty-four kbps signals from the four-wire bus 20 into analog voice signals to be delivered to the terminal equipment 28. Additionally the terminal adapter 32 generates and receives call control related messages to and from the switching module 30.

All of the terminals 22, 23, 24, 25, 26, 27, 28, and 29 are fully addressable so that services are provided on a call-by-call basis.

To set up a call from a terminal such as the terminal 25 of FIG. 1, a caller depresses a key in the terminal 25 to choose between a voice call for talking and a data connection for transmitting a data message. Then the handset is taken off-hook to use a channel to the central office switching module 30.

Figure 2:
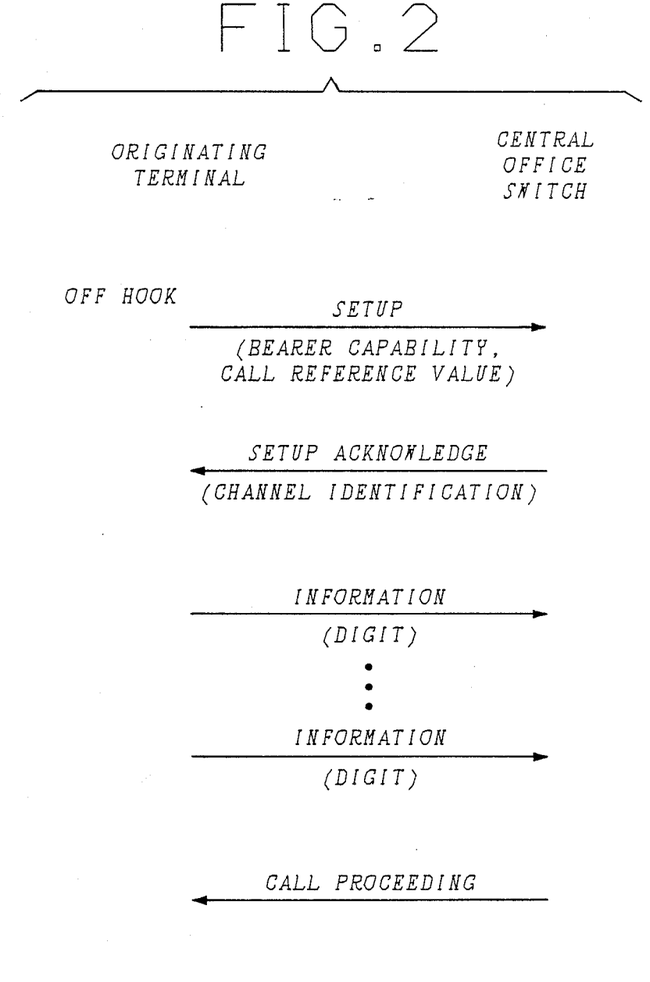
FIG. 2 is a diagrammatic presentation of control messages which are exchanged between a terminal and the central office for commencing a call.
Figure 3:
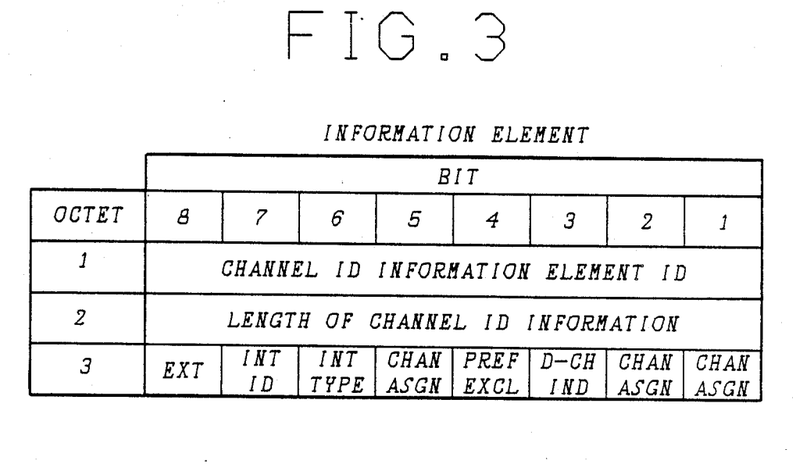
FIG. 3 is a table showing the format of an information element in a control message.

Referring now to FIG. 2, message oriented signaling is used to initiate the call when the user takes the terminal 25 off-hook. FIG. 2 shows graphically the message exchanges made through the associated D-channel of the four-wire bus 21, the network termination 33, the two-wire loop 31 and the line card 34 in the central office switch for setting up the call. For the first step after the originating terminal 25 goes off-hook, the originating terminal 25 sends a message SETUP including the bearer capability, a preferred B-channel, the call reference value, and whether the call is for voice or data.

The message SETUP contains bearer capability information detailing the type of information to be transmitted and therefore requesting either a voice channel, a circuit or packet switched data channel, or the 16 kbps data channel. The call-reference value is used in all subsequent messages relating to the same call. A normal off-hook indicates a voice connection request which in the United States requires $\mu$-law pulse code modulation. In other countries, A-law pulse code modulation is used. For a data call, the setup message indicates the required format and data rate. All of this information is transmitted through the integrated services line unit 36 and the packet switching unit 40 into the switching module processor 52 of the central office switch. There a data bank is accessed to determine which of six possible channels is assigned for the connection.

When the message SETUP is received at the central office switching module 30, the switching equipment prepares to establish a connection. In the central office, a request is made to access the data bank in the switching module processor 52. That data bank contains information on the status of the integrated services digital network two-wire loop 31.

In the data bank, stored information includes the busy or idle status of the several channels available in the basic rate interface two-wire loop 31. The switching module processor 52 analyzes the connection request from the off-hook terminal 25 and the status of the two-wire loop 31 and then decides which B-channel is to be assigned for the requested connection.

Figure 4:
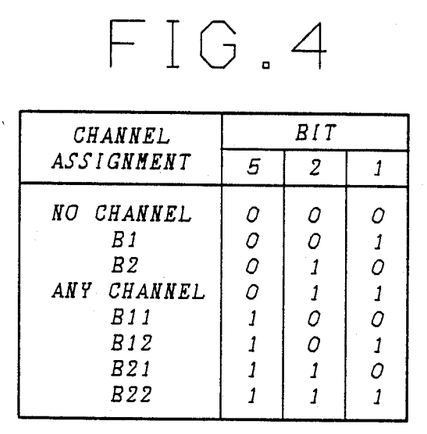
FIG. 4 is a table showing a code used in the information element of FIG. 3 for assigning a channel to a terminal for use.

Referring now to FIG. 4, the switching module processor 30 transmits the three bit message representing the selected channel assignment. As shown in FIG. 4, if all the selectable channels are busy, the three bit code 000 is sent to the line card 34 and the terminal equipment. If the B-channel B1 is selected, the code 001 is sent. If the sub B-channel B21 is selected, the code 110 is sent to the line card and the terminal equipment. Except for the "any channel" assignment, the codes for other selections are clear enough in FIG. 4. The "any channel" code indicates that the preferred B-channel is assigned. The channel selection code is held in the line card 34 and in the terminal equipment, such as terminal 25, while the connection is established and held.

A methodology is used for determining how the switching module processor 30 selects the channel to be connected. If all of the assignable channels are idle or if only one B-channel is busy, then an entire idle B-channel, either channel B1 or channel B2, is assigned whether the request is for a voice channel or a sixty-four kbps data channel.

The selection becomes more complicated when both B-channels B1 and B2 are busy. When the next request for a new call setup occurs, the data bank in the switching module processor 52 is accessed. The switching module processor 52 then determines that both B-channels B1 and B2 are busy. If both B-channels are busy with data calls, a rejection/busy signal is sent back, respectively, to the terminal requesting service or to the calling station if a terminal on the busy line is being called. If one channel is busy with a data call and the other is busy with a voice call or if both B-channels B1 and B2 are carrying voice calls, a request to connect a third voice channel causes a channel re-assignment as well as a new channel assignment. The switching module processor 52 sends codes so that the terminal equipment assigned to the B-channel B1 is reassigned to sub B-channel B11. In sequence the switching module processor sends codes so that the terminal equipment requesting the new call setup is assigned to sub B-channel B12. These two sub B-channels are thirty-two kbps channels.

Voice terminal equipment 25 converts analog voice signal to an eight-bit voice sample code for the standard sixty-four kbps transmission rate. Considering that terminal 25 is to be assigned a thirty-two kbps sub B-channel, the bit stream from the terminal 25 must be converted to the thirty-two kbps ADPCM format before it is applied to the four-wire bus 20. Thus a PCM/ADPCM code converter circuit 65 is interposed in the terminal 25 for this purpose. This code converter circuit 65 either converts eight-bit voice sample code from the terminal 25 in to the sixty-four kbps pulse code modulation (PCM) format or to the four-bit voice sample code used in the thirty-two kbps adaptive differential pulse code modulation (ADPCM) format on the four-wire bus 21. The PCM (eight-bit) format and/or the ADPCM (four-bit) format bit streams on the busses 20 and 21 are merged within the network termination 33 and are transmitted along the two-wire loop 31 to the switching module 30. In the line card 34, a code converter circuit 66, which is similar to the converter circuit 65, either passes the eight-bit code or converts the four-bit voice sample code to the eight-bit PCM code format used within the switch.

For transmission from the switching module 30 to the terminal 25, the code converter circuit 66 either passes eight-bit code (PCM format) from the switching module 30 as the eight-bit voice sample code on the two-wire loop 31 or converts the eight-bit code to the four-bit voice sample code of the ADPCM format on the two-wire loop 31. The bit stream on the two-wire loop 31 is broadcast to both of the four-wire busses 20 and 21. At the voice terminal 25, the assigned B-channel or sub B-channel is selected, and the bit stream is converted by the code converter circuit 65. If a sub B-channel is assigned, the four-bit voice sample code is converted to the eight-bit voice sample code for the voice terminal 25. If a B-channel is assigned, the eight-bit code passes. The eight-bit code words are converted into analog voice signals in the code converter circuit 65. Appropriate code conversions are described in detail in Fascicle III.3—Recommendation G.721, "32 kbit/s ADAPTIVE DIFFERENTIAL PULSE CODE MODULATION (ADPCM)". The foregoing choice of which mode of conversion is to be undertaken by the PCM/ADPCM code converter circuit 65 is made by decoding the code words sent by the switching module processor 52 for the channel assignments, as presented in FIG. 4.

The new basic rate interface arrangement can support several combinations of active channels up to four voice channels operating simultaneously. Some of the combinations of active channels include: (1) both B-channels B1 and B2 carrying sixty-four kbps voice, (2) B-channel B1 carrying sixty-four kbps voice and B-channel B2 carrying sixty-four kbps data, (3) both sub B-channels B11 and B12 carrying thirty-two kbps voice and B-channel B2 carrying sixty-four kbps voice, (4) both sub B-channels B11 and B12 carrying thirty-two kbps voice and B-channel B2 carrying sixty-four kbps data, and (5) both sub B-channels B11, B12, B21 and B22 carrying thirty-two kbps voice.

Figure 7:
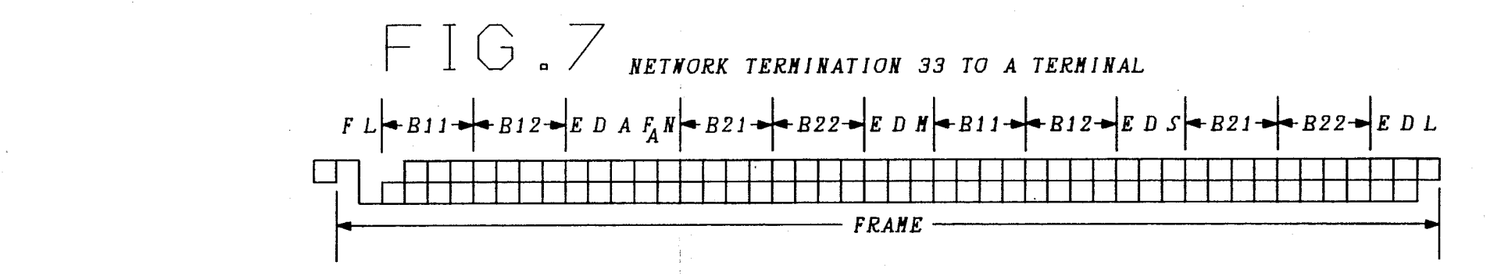
FIG. 7 shows a new frame format used for transmitting a bit stream including voice sub B-channels B11, B12, B21 and B22 from the network termination to a terminal.
Figure 8:
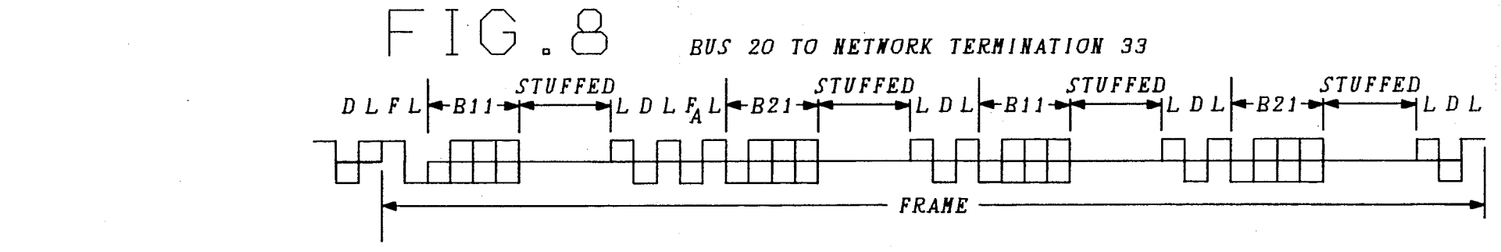
FIG. 8 shows a new frame format used for transmitting a bit stream including voice sub B-channels B11 and B21 from a four-wire bus to the network termination.
Figure 9:
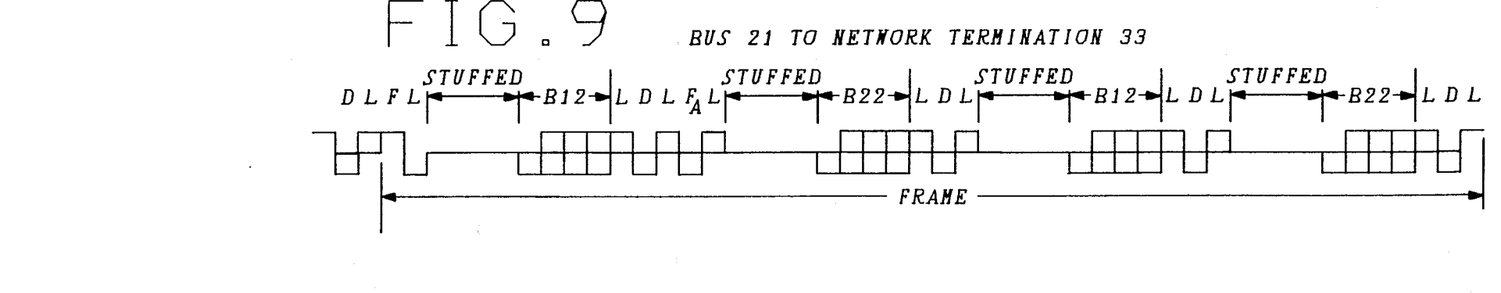
FIG. 9 shows a new frame format used for transmitting a bit stream including voice sub B-channels B12 and B22 from another four-wire bus to the network termination.

Integrated services digital network, basic rate interface standard frame format helps define some of the selections of channel assignments. A fuller understanding of the subchannel assignments can be developed by reference to FIGS. 5 and 6 showing the standard frame formats and FIGS. 7, 8 and 9 showing how the standard frame formats are adapted for sub B-channel operation.

Figure 5:
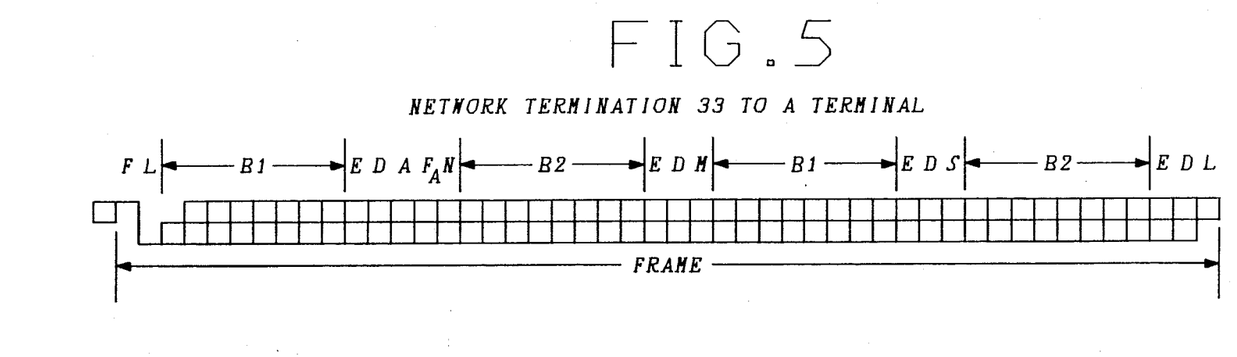
FIG. 5 shows a standard frame format used for transmitting a bit stream including B-channels B1 and B2 from a network termination to a terminal.

Referring now to FIG. 5, there is shown a frame format for transmitting a digital bit stream from the network termination 33 of FIG. 1 to terminal equipment. There are forty-eight bits per frame. The first two bits F and L are the framing bit and a DC balancing bit. There are four octets of B-channel bits. As shown alternate octets represent the B-channels B1 and B2. Other bits are included for the D-channel, D-channel echo, etc. As long as the combination of active channels is not changed, the frame format of FIG. 5 will repeat continuously. If one B-channel, for instance B-channel B2, were idle, the bits identified as B2 would be all ones (a neutral signal).

Figure 6:
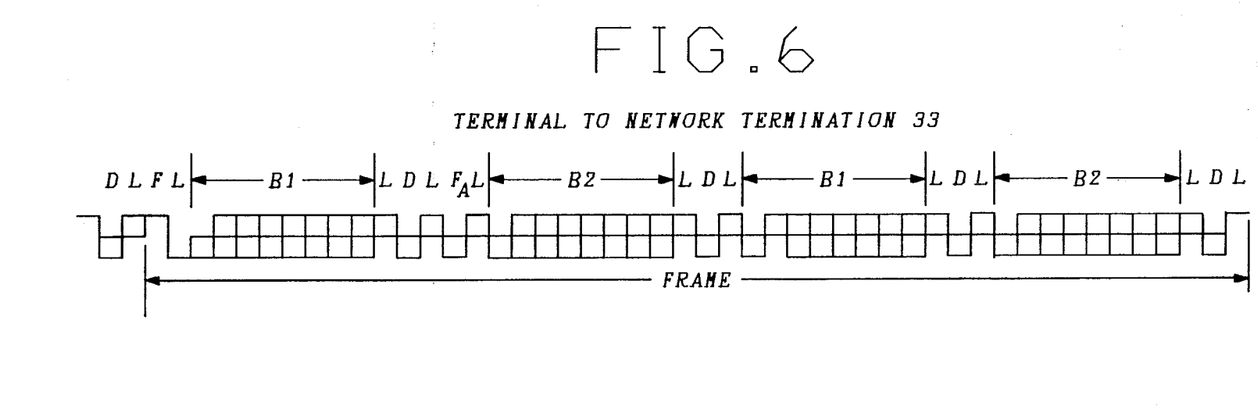
FIG. 6 shows a standard frame format used for transmitting a bit stream including B-channels B1 and B2 from a terminal to the network termination.

FIG. 6 shows a frame format for the opposite direction of transmission from the terminal equipment to the network termination 33 of FIG. 1. Although there are again forty-eight bits per frame, the frame of FIG. 6 is not symmetrical with the frame of FIG. 5. Additionally the frame format of FIG. 6 is delayed by two bits from the frame format of FIG. 5. There are, however, four octets of B-channel bits in FIG. 6. Alternate octets represent the B-channels B1 and B2. The initial zero bit in a channel must be a negative polarity signal to satisfy the DC balancing scheme. Other bits for framing, DC balancing, D-channel, etc are also included. DC balancing bit L is a neutral signal for an even number of zeros and is a positive signal for an odd number of zeroes. As previously mentioned, an idle channel will be populated with all one bits.

The frame formats of FIGS. 5 and 6 are standard integrated services digital network, basic rate interface frame formats which are used when the B-channels B1 and B2 are active in the arrangment of FIG. 1.

Referring now to FIG. 7, there is shown another frame format for transmitting a digital bit stream from the network termination 33 in FIG. 1 to any of the terminal equipments. This frame format of FIG. 7 is similar to the format of FIG. 5 except that the four octets of bits are replaced by eight nibbles of bits, each including four bits. Sequentially those nibbles represent sub B-channels B11, B12, B21 and B22 which then repeat within the frame. The frame format of FIG. 7 repeats in subsequent frames as long as the combination of active channels does not change.

In FIGS. 8 and 9, the frame formats are for transmitting opposite direction bit streams for the combination of sub B-channels of FIG. 7. FIG. 8 is an example of the format on the bus 20, and FIG. 9 is an example of the format on the bus 21. These frame formats are similar to the frame format of FIG. 6 except that the four octets of bits are replaced by eight nibbles of bits, each nibble including four bits.

In FIG. 8 the nibbles represent in order the sub B-channel B11, a nibble stuffed with all ones, sub B-channel B21 and another nibble stuffed with all ones. This pattern repeats within the frame and in subsequent frames of bits transmitted from the terminal equipment through the bus 20 to the network termination 33, so long as the combination of active channels does not change.

In FIG. 9 the nibbles represent in order a nibble stuffed with all ones, the sub B-channel B21, another nibble stuffed with all ones and the sub B-channel B22. Again this pattern repeats within the frame and in subsequent frames as long as the combination of active channels does not change.

The frame formats of FIGS. 7, 8 and 9 are specially adapted for an integrated service digital network, basic rate interface transmitting bit streams of thirty-two kbps voice channels. Such bit streams are produced by combinations of the PCM/ADPCM code converter circuits 65 from a group of voice terminals. Since all other equipment is arranged to handle octets of bits, the thirty-two kbps voice channel nibbles are specially handled. Each voice terminal 24, 25, 26, 27 and 29 is equipped with the PCM/ADPCM code converter 65 for converting eight-bit voice sample code to either eight-bit voice sample code or to four-bit voice sample code. The terminal adapter 32, associated with the terminal 28, also is equipped with the PCM/ADPCM code converter 65. In the line card 34 the PCM/ADPCM code converter 66 sequentially converts codes for all active channels.

The voice terminals 24, 25, 26, 27, 28 and 29 also stuff bits to produce the desired octets of bits from the nibbles of bits output from PCM/ADPCM converter circuits 65. Each PCM/ADPCM converter circuit 65, associated with a terminal, generates a nibble of data every 1/8000 second from a voice sample. When a sub-channel selection is made, the switching module processor 30 sends a code to the active terminal to tell the associated terminal PCM/ADPCM code converter circuit 65 whether to use PCM or ADPCM. When ADPCM is selected, the channel selection code from the switching module processor 30 informs the relevant PCM/ADPCM code converter circuit 65 whether to bit stuff the first nibble or the second nibble of the B-channel which is to be used. The PCM/ADPCM code converter circuits 65, associated with the terminals, include an arrangement for producing both a nibble of coded voice signal and a nibble of one bits to stuff into the otherwise vacant four-bits of the relevant B-channel octet.

From each voice terminal, any digitized voice data, which is assigned to the sub B-channel B11, is put into the first nibble of the first octet of the B-channel. Then the associated code converter circuit 65 fills in, or stuffs, four one bits into the second nibble of the first octet of the B-channel. The resulting octet is transmitted in the channel that generally is called the B-channel B1. Since every one bit is electrically neutral, the resulting octet effectively occupies only the first nibble of the B-channel B1.

From any voice terminal, digitized voice data, which is assigned to the sub B-channel B12, is put into the second nibble of the first octet of the same B-channel. Then the associated code converter circuit 65 stuffs four one bits into the first nibble of the first octet of the B-channel. The nibble, representing the sub B-channel B12, effectively occupies only the second nibble of the B-channel B1.

When the bit streams from two PCM/ADPCM code converter circuits 65, associated with two different voice terminals, are applied to the same B-channel, such as the B-channel B1, the bit streams are merged through the network termination 33 into the two-wire loop 31.

Because of the bit stuffing with electrically neutral one bits, the merging effectively performs a logical AND function. The merged bit stream includes two nibbles of digitized voice data per B-channel twice per frame. Thus the bit streams, represented by the frame formats of FIGS. 8 and 9, are merged into a single bit stream on the two-wire loop 31.

Conversely, when the bit stream from the network termination 33 is being broadcast to the terminals, that bit stream is shown in FIG. 7. The eight bit bytes are separated into separate nibbles by the PCM/ADPCM code converter circuits 65, associated with the relevant voice terminals. At each terminal sharing a B-channel, the PCM/ADPCM code converter circuit 65, under control of the assigned channel selection code, responds to the frame of bits by selecting out the nibbles of the assigned channel for delivery to the terminal.

Because of the integrated services digital network, basic rate interface standard, the order of activating the sixty-four kbps data channels and the voice channels determines the number of channels which can be served simultaneously by a pair of four-wire busses.

For example two sixty-four kbps data terminals 22 and 23 of FIG. 1 can be operated simultaneously. One data channel can be operated on each of the busses 20 and 21 or both can be operated on the same bus. If there are other sixty-four kbps data terminals connected to either of the busses 20 and 21, those other data terminals cannot be operated while two data terminals are being operated on the busses. This is a limit of the prior basic rate interface arrangements as well as the proposed new arrangement If one sixty-four kbps data terminal and two voice terminals are activated, they can operate simultaneously. With the new arrangement one sixty-four kbps data channel and one thirty-two kbps voice sub B-channel can be operated simultaneously on one bus while another thirty-two kbps voice sub B-channel is operated on the other bus. No other data or voice channels can be operated on the same pair of four-wire busses at that time. These two voice sub B-channels can handle twice as many voice calls, as the number of calls, which heretofore could be operated simultaneously with a sixty-four kbps data channel.

Also with the new arrangement, four voice terminals can be operated simultaneously. Either three or four thirty-two kbps voice sub B-channels can be operated simultaneously. One or two thirty-two kbps voice sub B-channels are operated on each four-wire bus. Operating either three or four voice sub B-channels simultaneously enables carrying more voice traffic than can be carried by the two sixty-four kbps voice channels simultaneously available heretofore with the basic rate interface.

With the terminal connection arrangement of FIG. 1 wherein the four-wire busses 20 and 21 can be laid in opposite directions from the network termination 33, there is a limit on the number of voice sub B-channels which can be served by one four-wire bus. Only one voice sub B-channel can be served by the same B-channel, e.g., B-channel B1, on one four-wire bus because of restrictions in the basic rate interface standard frame format. In that format, the first zero bit of each channel octet must be a negative polarity when transmitted from a terminal to the network termination 33. It is not possible to satisfy this requirement of the format when two voice terminals operate on sub B-channels of the same B-channel and on the same four-wire bus.

Figure 10:
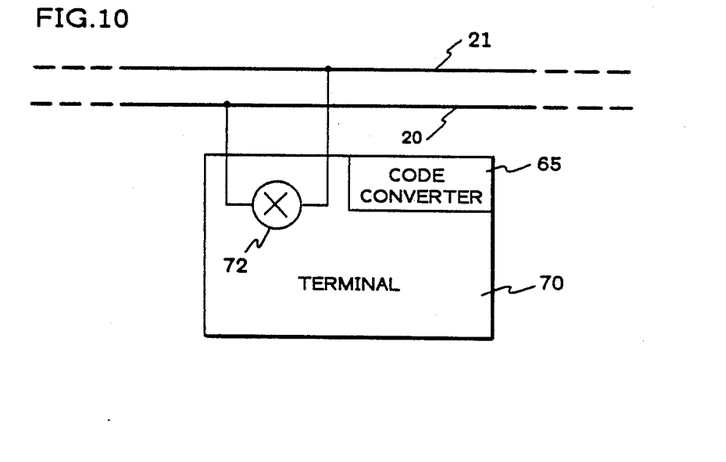
FIG. 10 is a block diagram of a customer terminal arrangement for selectively connecting the terminal to either of two four-wire busses.

Referring now to FIG. 10, there is shown a terminal to four-wire bus connection arrangement which expands the number of combinations of voice terminals which can be operated simultaneously. For an example in FIG. 10, a terminal 70 is connected with both of the busses 20 and 21. A switch 72 within the terminal 70 is interposed so that the input and output of the terminal can be switched to either the bus 20 or the bus 21. Firmware within the terminal 70 is designed to connect terminal 70 to the bus 21 if either sub B-channel B11 or B21 is assigned and to the bus 20 if either sub B-channel B12 or B22 is assigned. The firmware within the terminal causes the terminal 70 to connect to the bus 20 (or 21) when an entire B-channel is assigned. This terminal connection arrangement relieves the restrictions barring some combinations of terminals from operating simultaneously, as in the arrangement of FIG. 1.

Figure 11:
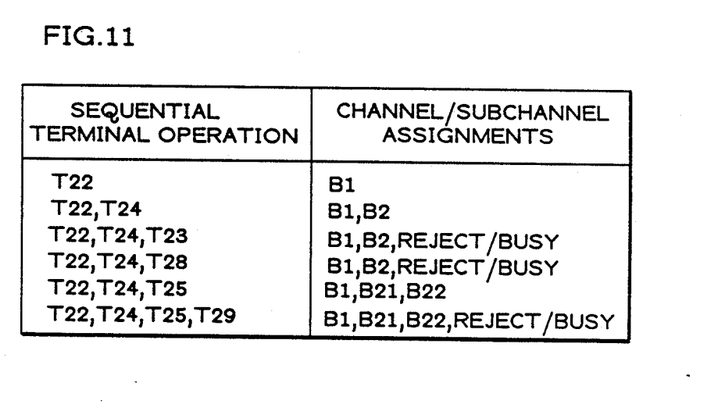
FIG. 11 is a table that shows an exemplary sequence of B-channels and sub B-channels which are assigned to terminals seeking to operate simultaneously.
Figure 12:
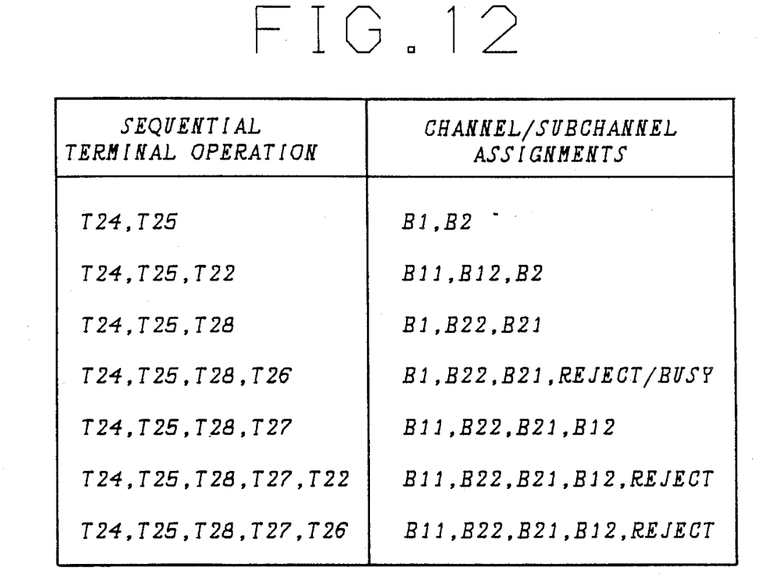
FIG. 12 is a table that shows another exemplary sequence of B-channels and sub B-channels which are assigned to terminals seeking to operate simultaneously.
Figure 13:
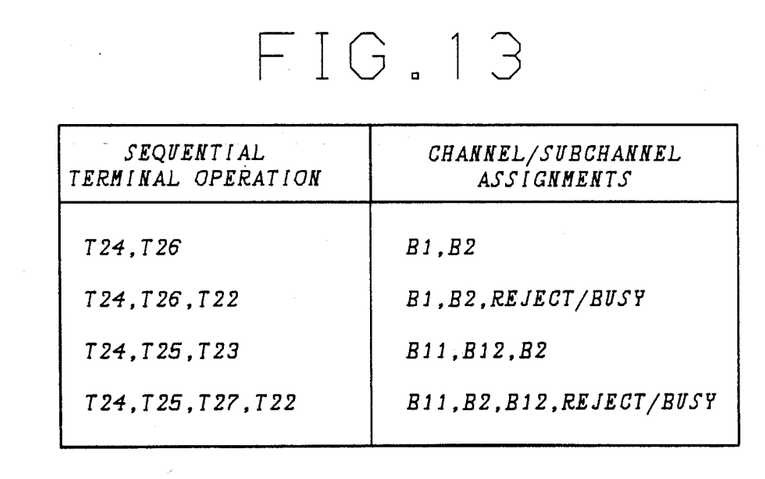
FIG. 13 is a table that shows a further exemplary sequence of B-channels and sub B-channels which are assigned to terminals seeking to operate simultaneously.

FIGS. 11, 12 and 13 present examples of sequential activation of various combinations of the data terminals and the voice terminals of FIG. 1 to more fully illustrate the overall operation of the terminal network and the restrictions on the number of simultaneously operating terminals.

In FIGS. 11, 12 and 13 the lefthand column presents the combination of terminals attempting to operate simultaneously. The righthand column presents the channel or sub-channel assigned to the respective terminal (in the lefthand column) and in some cases gives an indication that either the request is rejected or a busy signal is sent. Each row of those figures represents a new combination in a sequence of terminals seeking to operate simultaneously on the one pair of four-wire busses 20, 21 of FIG. 1.

In the first row of FIG. 11, the data terminal 22 (T22) seeks to operate on the bus 20 and is assigned channel B1. In the second row, the voice terminal 24 (T24) seeks to operate simultaneously on bus 20 with the data terminal 22 (T22). Voice terminal 24 is assigned to channel B2. In the third row, the data terminal 23 (T23) seeks to operate on the bus 21, while the data terminal 22 (T22) and the voice terminal 24 (T24) are operating on the bus 20. There are no spare channels so the request to operate the data terminal 23 (T23) is rejected. In the fourth row, the voice terminal 28 (T28) seeks to operate on the bus 20 while the data terminal 22 (T22) and the voice terminal 24 (T24) are operating on the bus 20. There is no spare channel, and there is no spare sub-channel. Although the channel B2 might be split into voice sub B-channels B21 and B22, such a split cannot be assigned to the voice terminals 24 and 28 because they are connected to the same four-wire bus 20. The basic rate interace standard frame format requires the first zero bit of each channel byte to be a negative polarity when transmitted from the terminal to the network termination. That format cannot be achieved with both sub B-channels connected to the same four-wire bus 20. In the fifth row, the voice terminal 25 seeks to operate on the bus 21 of FIG. 1 while the data terminal 22 and the voice terminal 24 are operating on the bus 20. There is a spare sub B-channel, but it is only made available by the voice terminal 24 being switched to sub B-channel B21 on the bus 20 opening the sub B-channel B22 on the bus 21. The switching is accomplished by the switching module 30 that stores required information in the line card 34 which also transmits the necessary information to the terminals 24 and 25.

Since there is a data channel and two voice sub B-channels operating concurrently, the basic rate interface is fully loaded. Any subsequent attempt for service, while the three terminals 22, 24 and 25 are operating, will be rejected if originated from a terminal or will receive a busy signal if another terminal is sought for completing a call from the central office. The sixth row represents such an attempt initiated by the voice terminal 29.

In the first row of FIG. 12, voice terminals 24 (bus 20) and 25 (bus 21) are operating simultaneously on the B-channels B1 and B2. As shown in the second row when the data terminal 22 of FIG. 1 requests service, the voice terminals 24 and 25 are switched to voice sub B-channels B11 and B12 while the data terminal 22 is assigned to the channel B2. As shown in the third row when the voice terminal 28 (bus 20) requests service simultaneously with the voice terminals 24 and 25, the voice terminal 25 (bus 21) is switched to a voice sub B-channel B21 and the voice terminal 28 (bus 20) is assigned the voice sub B-channel B22. As shown in the fourth row when the voice terminal 26 (bus 20) requests service simultaneously with the voice terminals 24, 25 and 28, the request is rejected because two voice terminals 24 and 28 already are using the available capacity of the bus 20.

As shown in the fifth row of FIG. 12 when the voice terminal 27 (bus 21) requests service concurrently with the voice terminals 24, 25 and 28 of FIG. 1, the request is accepted. The switching module 30 switches the voice terminal 24 (bus 20) to the voice sub B-channel B11. Terminals 25 (bus 21) and 28 (bus 20) remain assigned on voice sub B-channels B21 and B22. The request from the voice terminal 27 (bus 21) is assigned the voice sub B-channel B12. The basic rate interface standard frame format, having the first zero bit of each channel byte be a negative polarity signal when transmitted from a terminal, is maintained.

Four voice terminals operating simultaneously on thirty-two kbps sub-channels fill the capacity of the interface. Any other requests for either a sixty-four kbps data channel or a voice channel are rejected or given a busy signal, as shown in the sixth and seventh rows of FIG. 11.

In the first row of FIG. 13, voice terminals 24 (bus 20) and 26 (bus 20) are operating simultaneously on the B-channels B1 and B2. As shown in the second and third rows when the data terminal 22 (bus 20) requests service, the request is rejected because the bus 20 is operating at capacity.

In the third row of FIG. 13, the voice terminals 24 (bus 20) and 25 (bus 21) are operated simultaneously on the sub B-channels B11, B12 while data terminal 23 (bus 21) is operated on the B-channel B2. Prior to the service request from the data terminal 23, the voice terminals 24 and 25 operate on voice B-channels B1 and B2. The service request from the data terminal 23 causes the switching module 30 to switch the voice terminals 24 and 25 to the voice sub B-channels B11, B12.

With three voice terminals working, no data channel can commence operation, as shown in the fourth row.

The foregoing describes an arrangement and by way of examples the operation of an integrated services digital network, basic rate interface which will serve a sixty-four kbps data terminal and up to two voice terminals simultaneously or which will serve up to four voice terminals simultaneously. The described arrangement and the method of operation together with others made obvious in view thereof are considered to be within the scope of the appended claims.

I claim:

1. A communication system comprising:

a first passive bus;

an at least second passive bus;

first means for providing an integrated services digital network (ISDN) "U" basic rate interface (BRI) including two B-channels and a D-channel to a digital subscriber line;

a plurality of voice terminals, a predetermined number of said voice terminals being connected to said first passive bus and a predetermined number of said voice terminals being connected to said at least second passive bus, a first voice terminal connected to said first passive bus including means for providing a voice channel to a first portion of a first B-channel assigned to said first terminal on said first passive bus and a second voice terminal connected to said at least second passive bus including means for providing a voice channel to a second portion of a first B-channel assigned to said second voice terminal on said second passive bus; and means for combining said assigned first B-channel on said first passive bus with said assigned first B-channel on said at least second passive bus to yield a single first B-channel to be interfaced to said digital subscriber line by said first means.

2. A communication system as defined in claim 1 wherein said first voice terminal further includes means for generating a neutral line signal and for stuffing said neutral line signal into a second portion of said assigned first B-channel on said first passive bus and said second voice terminal further includes means for generating a neutral line signal and for stuffing said neutral line signal into a first portion of said assigned first B-channel on said at least second passive bus.

3. A communication system as defined in claim 2 further comprises a third voice terminal connected to said first passive bus including means for providing a voice channel to a first portion of a second B-channel assigned to said third voice terminal on said first passive bus and a fourth voice terminal connected to said at least second passive bus including means for providing a voice channel to a second portion of a second B-channel assigned to said fourth voice on said second passive bus, and wherein said means for combining further combines said assigned second B-channel on said first passive bus with said assigned second B-channel on said second passive bus to yield a single second B-channel to be interfaced to said digital subscriber line by said first means.

4. A communication system as defined in claim 3 wherein said third voice terminal further includes means for generating a neutral line signal and for stuffing said neutral line signal into a second portion of said assigned second B-channel on said first passive bus and said fourth voice terminal further includes means for generating a neutral line signal and for stuffing said neutral line signal into a first portion of said assigned second B-channel on said at least second passive bus.

5. A communication system as defined in claim 4 wherein each of said first and second B-channels includes eight bits, wherein each of said means for providing a voice channel includes means for encoding four bits of digitized voice data and wherein each of said means for generating a neutral line signal includes means for generating four logical one bits.

6. A communication system as defined in claim 5 wherein said means for combining includes means for ANDing said assigned first B-channels from said first and second passive busses and said assigned second B-channels from said first and second passive busses to yield said first B-channel and said second B-channel, respectively, to be interfaced to said digital subscriber line by said first means.

7. A communication system as defined in claim 6 wherein each of said voice terminals further includes means for generating a direct current balance bit for its assigned B-channel on its respective passive bus.

8. A method for transmitting multiple digitized voice channels on a single integrated services digital network (ISDN) basic rate interface (BRI) including at least first and second passive busses being interfaced to a single digital subscriber line, the method comprising the steps of:

encoding four bits of digitized voice data representing a first voice data sample and positioning them into a first nibble of an octet of a first basic rate interface B-channel on said first passive bus;

stuffing four bits of an electrically neutral line signal into a second nibble of the octet in the first basic rate interface B-channel on said first passive bus;

encoding four bits of digitized voice data from a second voice data sample and positioning them into a second nipple of an octet in a first basic rate interface B-channel on said second passive bus;

stuffing four bits of an electrically neutral line signal into the first nipple of the octet in the first basic rate interface B-channel on said second passive bus; and combining said first basic rate interface B-channel on said first passive bus with said first basic rate interface B-channel on said second passive bus to yield a single first basic rate interface B-channel including said encoded voice data in said first nibble of said first basic rate interface B-channel from said first passive bus and said encoded voice data from said second nibble of said first basic rate interface B-channel from said second passive bus.

9. A method as defined in claim 8 further including the steps of:

encoding four bits of digitized voice data representing a third voice data sample and positioning them into a first nibble of an octet of a second basic rate interface B-channel on said first passive bus;

stuffing four bits of an electrically neutral line signal into a second nibble of the octet in the second basic rate interface B-channel on said first passive bus;

encoding four bits of digitized voice data from a fourth voice data sample and positioning them into a second nipple of an octet in a second basic rate interface B-channel on said second passive bus;

stuffing four bits of an electrically neutral line signal into the first nipple of the octet in the second basic rate interface B-channel on said second passive bus; and combining said second basic rate interface B-channel on said first passive bus with said second basic rate interface B-channel on said second passive bus to yield a second basic rate interface B-channel including said encoded voice data in said first nibble of said second basic rate interface B-channel from said first passive bus and said encoded voice data from said second nibble of said second basic rate interface B-channel from said second passive bus.

10. The method as defined in claim 9 further including the steps of:

generating a first direct current balance bit for said first basic rate interface B-channel on said first passive bus;

generating a second direct current balance bit for said first basic rate interface B-channel on said second passive bus;

generating a third direct current balance bit for said second basic rate interface B-channel on said first passive bus; and generating a fourth direct current balance bit for said second basic rate interface B-channel on said second passive bus.

11. A common communication system comprising:

switching means including means for interfacing to at least one digital, subscriber line for transmitting and receiving an integrated services digital (ISDN) basic rate interface (BRI) including first and second B-channels and a D-channel, and means for assigning at least two voice channels to operate simultaneously on one of said first and second B-channel;

a digital subscriber line;

first means for providing an integrated services digital network (ISDN) "U" basic rate interface (BRI), said first means being connected to said digital subscriber line;

a plurality of voice terminals; and second means for interfacing said plurality of voice terminals to said first means, wherein said assigned at least two voice channels are supplied from said voice terminals to said first means to be transmitted to said switching means on said one of said first and second B-channel, said second means including a first passive bus, an at least second passive bus, a predetermined number of said plurality of voice terminals being connected to said first passive bus and a predetermined number of said plurality of voice terminals being connected to said at least second passive bus, a first voice terminal connected to said first passive bus including means for providing a voice channel to a first portion of a first B-channel assigned to said first voice terminal on said first passive bus and a second voice terminal connected to said at least second passive bus including means for providing a voice channel to a second portion of a first B-channel assigned to said second voice terminal on said second passive bus and means for combining said assigned first B-channel on said first passive bus with said assigned first B-channel on said at least second passive bus to yield a single first B-channel to be interfaced to said digital subscriber line by said first means.

12. A common communication system as defined in claim 11 wherein said first voice terminal further includes means for generating a neutral line signal and for stuffing said neutral line signal into a second portion of said assigned first B-channel on said first passive bus and said second voice terminal further includes means for generating a neutral line signal and for stuffing said neutral line signal into a first portion of said assigned first B-channel on said at least second passive bus.

13. A common communication system as defined in claim 12 further comprising a third voice terminal connected to said first passive bus including means for providing a voice channel to a first portion of a second B-channel assigned to said third voice terminal on said first passive bus and a fourth voice terminal connected to said at least second passive bus including means for providing a voice channel to a second portion of a second B-channel assigned to said fourth voice terminal on said second passive bus, and wherein said means for combining further combines said assigned second B-channel on said first passive bus with said assigned second B-channel on said second passive bus to yield a single second B-channel to be interfaced to said digital subscriber line by said first means.

14. A common communication system as defined in claim 13 wherein said third voice terminal further includes means for generating a neutral line signal and for stuffing said neutral line signal into a second portion of said assigned second B-channel on said first passive bus and said fourth voice terminal further includes means for generating a neutral line signal and for stuffing said neutral line signal into a first portion of said assigned second B-channel on said at least second passive bus.

15. A communication system as defined in claim 14 wherein each of said first and second B-channels includes eight bits, wherein each of said means for providing a voice channel includes means for encoding four bits of digitized voice data and wherein each of said means for generating a neutral line signal includes means for generating four logical one bits.

16. A common communication system as defined in claim 15 wherein said means for combining includes means for ANDing said assigned first B-channels from said first and second passive busses and said assigned second B-channels from said first and second passive busses to yield said first B-channel and said second B-channel, respectively, to be interfaced to said digital subscriber line by said first means.

17. A common communication system as defined in claim 15 wherein each of said voice terminals further includes means for generating a direct current balance bit for its assigned B-channel on its respective passive bus.

* * * * *